United States Patent
Lantz et al.

(10) Patent No.: US 9,535,820 B2
(45) Date of Patent: Jan. 3, 2017

(54) TECHNOLOGIES FOR APPLICATION VALIDATION IN PERSISTENT MEMORY SYSTEMS

(71) Applicant: Intel Corporation, Santa Clara, CA (US)

(72) Inventors: Philip R. Lantz, Cornelius, OR (US); Thomas Willhalm, Sandhausen (DE); Kirill Instrumentov, Moscow (RU); Karthik Kumar, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/670,965

(22) Filed: Mar. 27, 2015

(65) Prior Publication Data

US 2016/0283354 A1 Sep. 29, 2016

(51) Int. Cl.
*G06F 9/44* (2006.01)
*G06F 11/36* (2006.01)

(52) U.S. Cl.
CPC ....... *G06F 11/3664* (2013.01); *G06F 11/3636* (2013.01); *G06F 11/3688* (2013.01)

(58) Field of Classification Search
None
See application file for complete search history.

(56) References Cited

U.S. PATENT DOCUMENTS

2004/0044508 A1* 3/2004 Hoffman, Jr. ....... G06F 17/5022
703/13

* cited by examiner

*Primary Examiner* — Chuck Kendall
(74) *Attorney, Agent, or Firm* — Barnes & Thornburg LLP

(57) ABSTRACT

Technologies for software testing include a computing device having persistent memory that includes a platform simulator and an application or other code module to be tested. The computing device generates a checkpoint for the application at a test location using the platform simulator. The computing device executes the application from the test location to an end location and traces all writes to persistent memory using the platform simulator. The computing device generates permutations of persistent memory writes that are allowed by the hardware specification of the computing device simulated by the platform simulator. The computing device replays each permutation from the checkpoint, simulates a power failure, and then invokes a user-defined test function using the platform simulator. The computing device may test different permutations of memory writes until the application's use of persistent memory is validated. Other embodiments are described and claimed.

24 Claims, 4 Drawing Sheets

402 A=10, B=11, C=12

404 Write A=5 to PM
406 Memory Fence
408 Cache Flush
410 Memory Fence
412 PM Commit
414 Write B=6 to PM
416 Write to volatile memory
418 Write C=7 to PM
420 Memory Fence
422 Cache Flush
424 Memory Fence
426 PM Commit

TECHNOLOGIES FOR APPLICATION VALIDATION IN PERSISTENT MEMORY SYSTEMS

BACKGROUND

Some computing systems include persistent memory, which may be byte-addressable, high-performance, non-volatile memory. Persistent memory may provide performance comparable to traditional volatile random access memory (RAM) while also providing data persistence. However, persistent memory may present additional challenges to application developers. In particular, application developers may have to guarantee that at any given time, data in persistent memory is consistent. Otherwise, unexpected failures such as hardware failures or power failures may result in data corruption.

Traditional software development tools such as compilers and debuggers may be used to correct errors and otherwise verify the correctness of applications using persistent memory. Additionally, a hypervisor-based framework for testing applications that use persistent memory is described in Philip Lantz et al., *Yat: A Validation Framework for Persistent Memory Software*, USENIX Annual Technical Conference at 433 (2014).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 4 is pseudocode of at least one embodiment of an application and associated test function that may be tested using the method of FIG. 3.

DETAILED DESCRIPTION OF THE DRAWINGS

Figure 1:
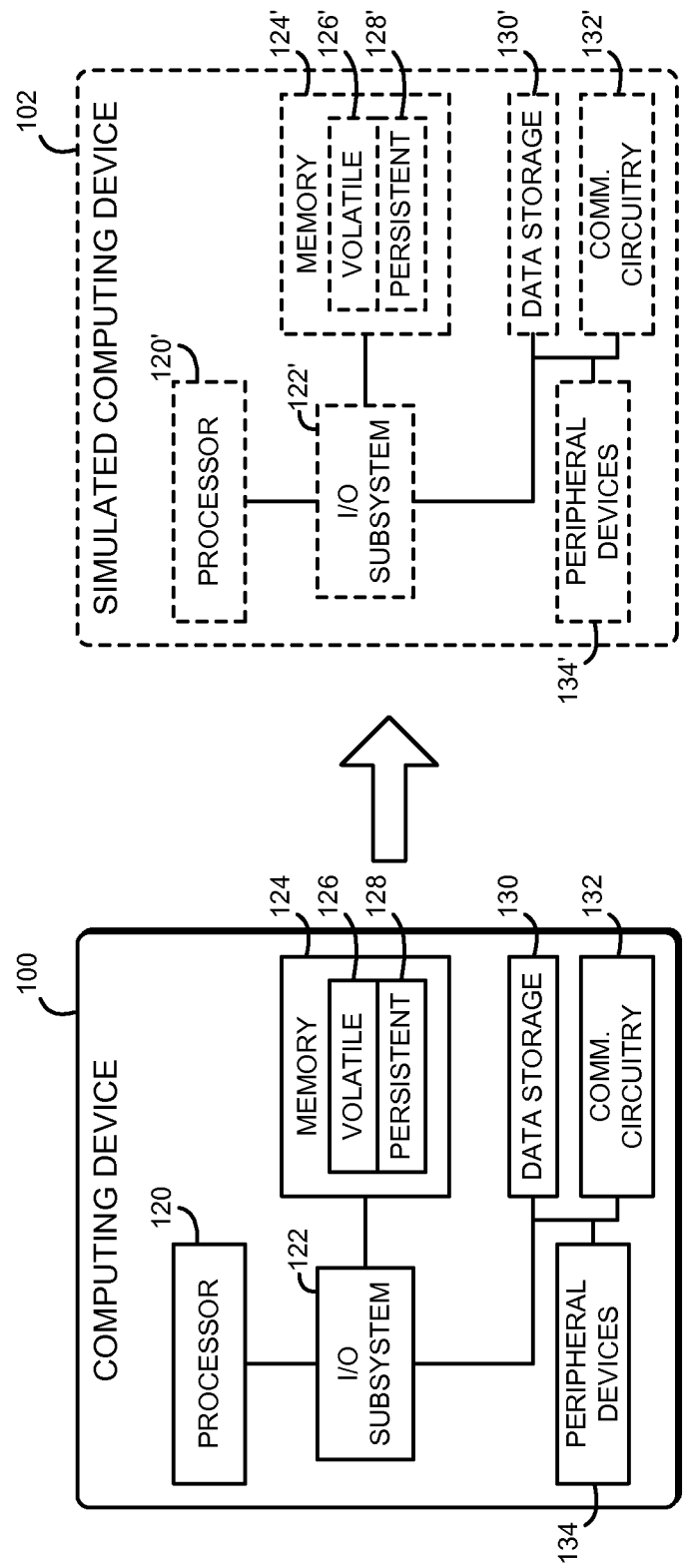
FIG. 1 is a simplified block diagram of at least one embodiment of a computing device for application testing with persistent memory.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a computing device 100 for testing persistent memory applications is configured with a full platform simulator and an application for testing. The platform simulator simulates execution of a simulated computing device 102 having persistent memory. In particular, the platform simulator simulates the contents of processor registers, volatile caches, volatile memory, and persistent memory of the simulated computing device 102. In use, as described in more detail below, the computing device 100 creates a checkpoint at a test location in the application (e.g., a function to be tested) and then simulates execution of the application up to an end location using the platform simulator. During simulated execution, the computing device 100 traces persistent memory writes performed by the application. After completing the simulated execution, the computing device 100 may generate many different permutations of persistent memory writes performed by the application and simulate power failures, for example by performing part but not all of the traced persistent memory writes. For each tested permutation, the computing device 100 executes a user-supplied test function using the platform simulator to verify the consistency of the simulated persistent memory following the simulated power failure. The computing device 100 may report any test failures to the user. By providing an automated framework for testing persistent memory consistency, the computing device 100 may improve the quality of applications using persistent memory. Additionally, the computing device 100 may perform application testing using user-level and/or application-level tools, without requiring modifications to an operating system or hypervisor. Additionally, in the illustrative embodiment, the computing device 100 has the same architecture as the simulated computing device 102; for example, the computing device 100 includes persistent memory. However, it should be understood that in some embodiments, the computing device 100 may have a different architecture from the simulated computing device 102 and/or may not include persistent memory.

The computing device 100 may be embodied as any type of computing device capable of performing the functions described herein, including, without limitation, a computer, a workstation, a multiprocessor system, a server, a rack-mounted server, a blade server, a laptop computer, a notebook computer, a network appliance, a web appliance, a distributed computing system, a processor-based system, and/or a consumer electronic device. As shown in FIG. 1, the computing device 100 includes a processor 120, an input/output subsystem 122, a memory 124, a data storage device 130, and communication circuitry 132. Of course, the computing device 100 may include other or additional components, such as those commonly found in a server device (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 further includes volatile memory 126 and persistent memory 128. The volatile memory 126 may be embodied as traditional RAM, meaning that any data contained in the volatile memory 126 is lost when power is removed from the computing device 100 and/or the volatile memory 126. The persistent memory 128 may be embodied as any byte-addressable, high-performance, non-volatile memory. For example, the persistent memory 128 may be embodied as battery-backed RAM, phase-change memory, memristor-based memory, or other types of persistent memory. The persistent memory 128 may include programs and data similar to the volatile memory 126; however, the contents of the persistent memory 128 are retained for at least some period of time when power is removed from the computing device 100 and/or the persistent memory 128.

The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 130 may be embodied as any type of device or devices configured for short-term or long-term storage of data such as, for example, memory devices and circuits, memory cards, hard disk drives, solid-state drives, or other data storage devices. Access to the data storage device 130 may be much slower than to the persistent memory 128. Additionally, the data storage device 130 may be accessed through a block device, file system, or other non-byte-addressable interface.

The communication circuitry 132 of the computing device 100 may be embodied as any communication circuit, device, or collection thereof, capable of enabling communications between the computing device 100 and other remote devices over a computing network. The communication circuitry 132 may be configured to use any one or more communication technology (e.g., wired or wireless communications, Ethernet, Bluetooth®, Wi-Fi®, WiMAX, Infiniband, etc.) and associated protocols (e.g., TCP, UDP, iWARP, RDMA, etc.) to effect such communication.

In some embodiments, the computing device 100 may also include one or more peripheral devices 134. The peripheral devices 134 may include any number of additional input/output devices, interface devices, and/or other peripheral devices. For example, in some embodiments, the peripheral devices 134 may include a display, touch screen, graphics circuitry, keyboard, mouse, speaker system, and/or other input/output devices, interface devices, and/or peripheral devices.

As shown in FIG. 1, the simulated computing device 102 may include simulated hardware components including a simulated processor 120', a simulated I/O subsystem 122', a simulated memory 124' including simulated volatile memory 126' and simulated persistent memory 128', a simulated data storage device 130', simulated communications circuitry 132', and simulated peripheral devices 134'. Those simulated components of the simulated computing device 102 may be similar to the corresponding components of the computing device 100, the description of which is applicable to the corresponding simulated components of the simulated computing device 102 and is not repeated herein so as not to obscure the present disclosure.

Figure 2:
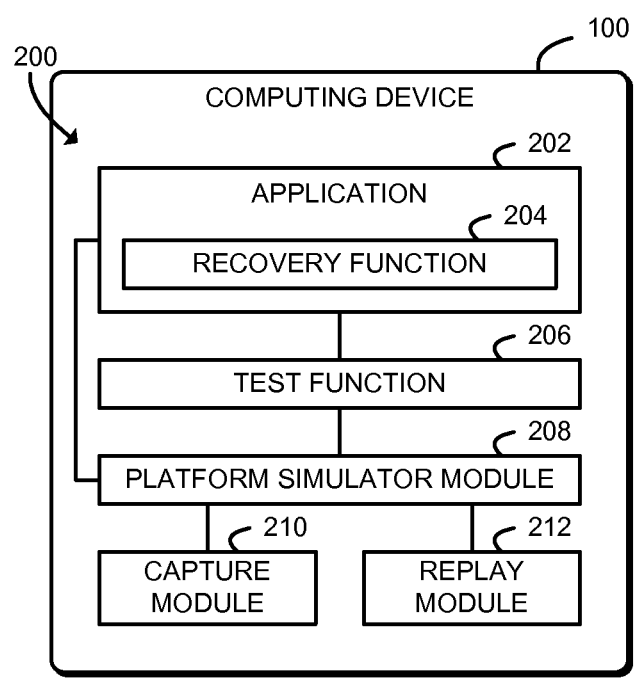
FIG. 2 is a simplified block diagram of at least one embodiment an environment that may be established by the computing device of FIG. 1.

Referring now to FIG. 2, in the illustrative embodiment, the computing device 100 establishes an application 202, a test function 206, a platform simulator module 208, a capture module 210, and a replay module 212. The various modules of the environment 200 may be embodied as hardware, firmware, software, or a combination thereof. For example the various modules, logic, and other components of the environment 200 may form a portion of, or otherwise be established by, the processor 120 or other hardware components of the computing device 100. As such, in some embodiments, any one or more of the modules of the environment 200 may be embodied as a circuit or collection of electrical devices (e.g., a capture circuit, a replay circuit, etc.).

The application 202 may be embodied as any application, module, function, subroutine, or other code or code module that manipulates data stored in persistent memory. The application 202 may be embodied as machine-executable code, bytecode, intermediate code, assembly code, source code, or any other code that may be executed by the computing device that is simulated by the platform simulator module 208. The application 202 may be embodied as user-level and/or kernel-level code. In some embodiments, the application 202 may also be executed natively by the computing device 100. The application 202 may include a recovery function 204. The recovery function 204 may be embodied as any application, module, function, subroutine, or other code that may be executed by the application 202 following a power outage, crash, or other failure of the application 202 in order to repair or otherwise recover data stored in the persistent memory 128. For example, the recovery function 204 for a database application 202 may attempt to repair data tables and associations between data tables following a power failure.

The test function 206 may be embodied as any user-defined function, subroutine, module, application, or other code that may be executed to verify the correctness of the data stored in persistent memory that was generated or otherwise manipulated by the application 202. The test function 206 may be a standalone module or, in some embodiments, may be incorporated in the application 202. For example, the test function 206 for a database application 202 may be embodied as an integrity checker that verifies the correctness of data tables, data rows, relationships between tables and rows, and/or other data stored in the persistent memory 128.

The platform simulator module 208 is configured to simulate the execution of an entire computing platform such as the simulated computing device 102, including simulation of processor state (e.g., register state and volatile cache state), memory state (volatile and persistent), data storage state, and other data and/or devices associated with the simulated computing device 102. The platform simulator module 208 may, for example, simulate booting an operating system and/or hypervisor on a simulated computing device 102, and then may simulate execution of the application 202 within that operating system. The platform simulator module 208 may generate checkpoints of the state of the simulated computing device 102, pause execution of the simulated computing device 102, restart execution of the simulated computing device 102 based on checkpoints, and/or perform other operations modifying the state of the simulated computing device 102. The platform simulator module 208 may be embodied as, for example, Intel® Simics® simulation technology.

The capture module 210 is configured to generate a state checkpoint for a test location within the application 202 using the platform simulator module 208. The capture module 210 is further configured to execute the application 202 using the platform simulator module 208 from the test location to a second location in the application 202 and trace the persistent memory state of the application 202 during simulated execution. The capture module 210 may generate trace data that is indicative of the persistent memory writes, memory fences, cache line flushes, persistent memory commits, or other persistent memory operations executed by the application 202 during simulated execution.

The replay module 212 is configured to generate many permutations of the memory writes performed by the application 202 using the trace data recorded by the capture module 210. Each permutation describes a possible ordering of the traced persistent memory writes that is allowed by the hardware specification of the simulated computing device 102. The replay module 212 is configured to replay each permutation of persistent memory writes from the saved checkpoint, simulate a power failure, and then invoke the test function 206 using the platform simulator module 208. The replay module 212 may report the results of the test function 206. The replay module 212 is configured to continue testing permutations of persistent memory writes until a failure is observed or until enough permutations have been successfully tested to validate the application 202.

Figure 3:
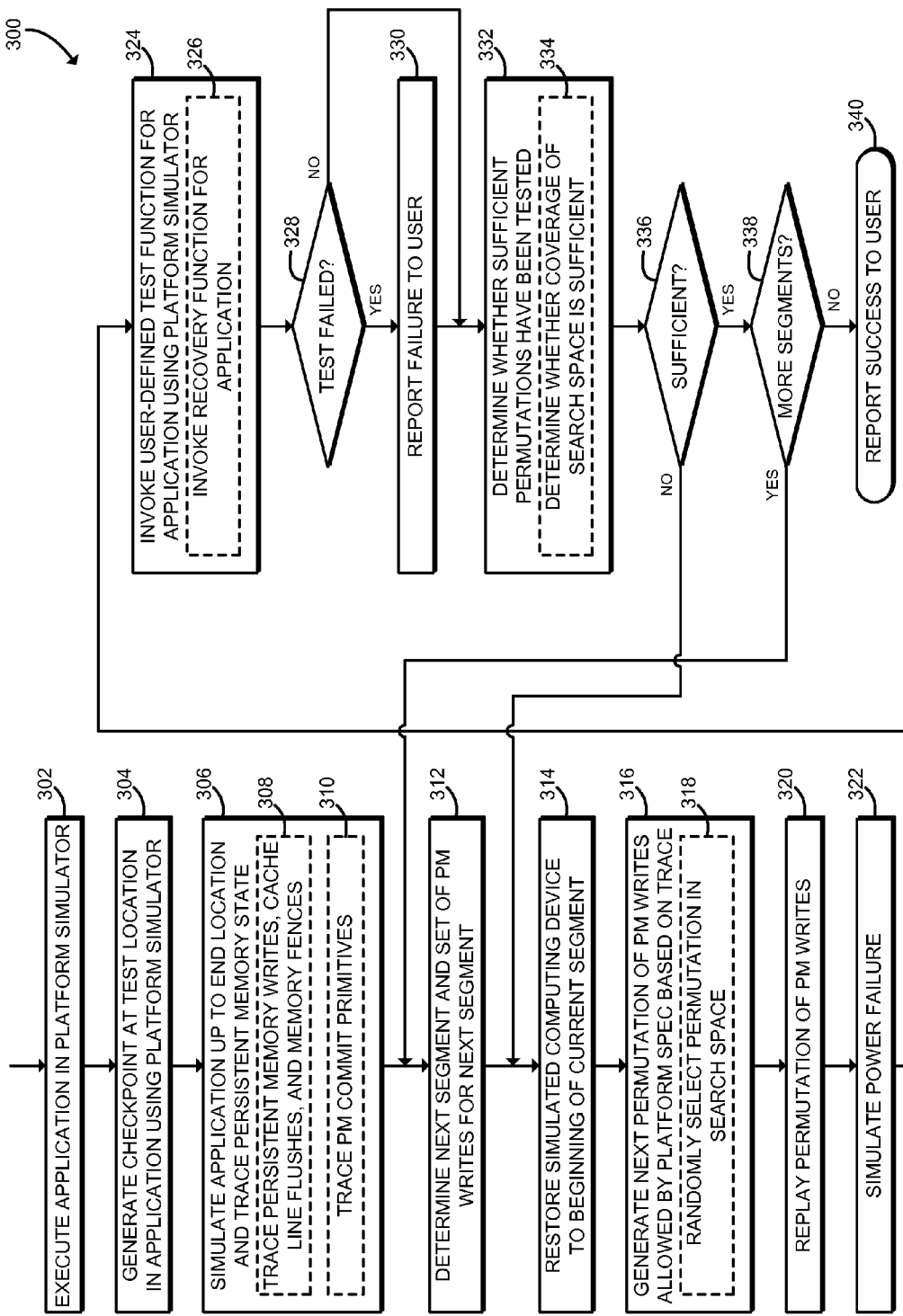
FIG. 3 is a simplified flow diagram of at least one embodiment of a method for application testing with persistent memory that may be executed by the computing device of FIGS. 1 and 2.

Referring now to FIG. 3, in use, the computing device 100 may execute a method 300 for application testing. The method 300 begins in block 302, in which the computing device 100 executes the application 202 in a platform simulator. The platform simulator may also execute any operating system or other code required to support execution of the application 202. The platform simulator simulates the state of a simulated computing device 102 during execution of the application 202, including the contents of simulated processor 120' registers or caches, simulated volatile memory 126', and simulated persistent memory 128'. In the illustrative embodiment, the platform simulator simulates a simulated computing device 102 having the same architecture as the computing device 100; however, in other embodiments the platform simulator may simulate a computing device having a different architecture. The computing device 100 may continue executing the application 202 in the platform simulator until reaching a test location within the application 202. The test location may be any user-defined location or breakpoint within the application 202, such as the beginning of a function, module, or other code segment that is to be tested. In block 304, the computing device 100 creates a checkpoint at the test location using the platform simulator. The checkpoint records the hardware and software state of the simulated computing device 102 within the platform simulator when execution reaches the test location, and may include or otherwise represent the contents of the simulated processor 120' registers and caches, the simulated volatile memory 126', and/or the simulated persistent memory 128'.

In block 306, the computing device 100 executes the application 202 in the platform simulator starting at the test location up to an end location in the application 202. Similar to the test location, the end location may be any user-defined location or breakpoint within the application 202, such as the end of the function, module, or other code segment that is to be tested. After reaching the end location, the platform simulator may suspend execution of the application 202. During simulation, the computing device 100 traces execution of the application 202. The trace data generated during the execution may be used to reconstruct modifications to the simulated persistent memory 128' of the simulated computing device 102, including the state of volatile caches and/or the state of the simulated persistent memory 128' at any particular time during the simulated execution.

In some embodiments, in block 308, the computing device 100 traces executed persistent memory writes, cache line flushes, and memory fences. Persistent memory writes may include any store instruction or other instruction that causes a value to be written to the simulated persistent memory 128'. Of course, for a simulated computing device 102 with write-back caching, the stored data may not immediately reach the simulated persistent memory 128'. Thus, in some embodiments the store instruction may place data in a simulated processor 120' cache and mark the associated cache line as dirty. A cache line flush may be embodied as an instruction or processor primitive that causes the simulated processor 120' to write the contents of simulated dirty cache lines to the simulated persistent memory 128'. The cache line flush may be embodied as, for example, a CLFLUSH instruction, a CLFLUSHOPT instruction, or a CLWB (cache line write back) instruction. A memory fence may be embodied as an instruction or processor primitive that enforces ordering for memory writes to the simulated persistent memory 128'. For example, the simulated processor 120' may guarantee that persistent memory stores (or cache line flushes) that occur before the memory fence in program order become globally visible before any persistent memory stores that occur after the memory fence in program order. The memory fence may be embodied as, for example, an SFENCE instruction or an MFENCE instruction.

In some embodiments, in block 310, the computing device 100 traces executed persistent memory commit primitives. A persistent memory commit primitive may be embodied as an instruction or other processor primitive that causes data that has been accepted to the persistent memory 128 to become persistent (i.e., to become durable). For example, even after data has been written back from processor caches to the persistent memory 128, that data may reside in one or more caches or other volatile memory structures of the memory controller, persistent memory module, or other component of the computing device 100. Executing the persistent memory commit primitive may cause such data to be committed to the persistent memory 128 and thus retained after any power failure. The persistent memory commit primitive may be embodied as, for example, a PCOMMIT instruction.

In block 312, the computing device 100 determines the next segment of the traced execution of the application 202 from the test location to the end location. The computing device 100 may segment the trace data based on the persistent memory commit primitives. After each persistent memory commit primitive, the contents of the simulated persistent memory 128' are determinable, because all prior persistent memory writes are guaranteed to be committed. Thus, the trace data may be split up into segments between the persistent memory commit primitives and each segment may be analyzed independently. Segmenting the trace data may greatly reduce the number of potential permutations of persistent writes and thus may reduce the time needed for application validation. Of course, in some embodiments, the computing device 100 may analyze the trace data as a single segment.

In block 314 the computing device 100 restores the state of the simulated computing device 102 to the beginning of the current segment. In other words, the state of the simulated computing device 102 is reset to its state at the beginning of the current segment. The restored state of the simulated computing device 102 may be based on the saved checkpoint at the test location as recorded in block 304. The state of the simulated computing device 102 may include the contents of the simulated processor 120' registers or caches, the simulated volatile memory 126', and/or the simulated persistent memory 128' during execution of the application 202.

In block 316, the computing device 100 generates a permutation of persistent memory writes traced by the computing device 100 during simulated execution of the application 202 in the current segment. To generate the permutation, the computing device 100 may re-arrange the order that the traced persistent writes are committed to the simulated persistent memory 128'. The computing device 100 only selects permutations that are allowed by the hardware specification of the simulated computing device 102. For example, persistent memory writes occurring before a memory fence and/or a cache flush may not be reordered to occur after the memory fence and/or cache flush. As another example, writes to the same memory address may not be reordered. The computing device 100 may select the next possible permutation of memory writes in sequence, for example if the total number of possible permutations is below a predefined threshold (e.g., 250 permutations). In some embodiments, in block 318 the computing device 100 may select a permutation randomly from a search space that includes all possible permutations of memory writes that are allowed by the simulated computing device 102. As described below, the number of possible permutations may be very large, and the computing device 100 may verify a random sampling of permutations rather than all possible permutations.

In block 320, the computing device 100 replays the selected permutation of persistent memory writes. The computing device 100 may adjust the saved state of the application 202 starting with the checkpoint corresponding to the test location. The computing device 100 may adjust the contents of the simulated processor 120' registers and volatile caches, the simulated volatile memory 126', and/or the simulated persistent memory 128' of the simulated computing device 102 by applying the persistent memory writes recorded in the trace data, using the write ordering of the selected permutation. In the illustrative embodiment, the computing device 100 may replay the permutation by adjusting the state data without executing the application 202 in the platform simulator. Additionally or alternatively, in some embodiments the computing device 100 may execute the application 202 in the platform simulator, starting from the saved checkpoint. In block 322, the computing device 100 simulates a power failure. The computing device 100 may, for example, stop replaying the selected permutation prior to committing all of the traced persistent writes to the simulated persistent memory 128'. After simulating the power failure, some but not all of the persistent memory writes may be committed, and thus the simulated persistent memory 128' of the simulated computing device 102 may be in an inconsistent state.

In block 324, the computing device 100 invokes the test function 206 using the platform simulator. The platform simulator begins executing the test function 206 using the modified system state resulting from the simulated power outage. As described above, the test function 206 may be embodied as any user-defined function, subroutine, module, application, or other user-specified code that performs a consistency check on the simulated persistent memory 128' associated with the application 202. For example, the test function 206 may examine data structures in the simulated persistent memory 128' (e.g., by following persistent memory pointers, checking database table relations, etc.). After execution, the test function 206 may indicate whether the consistency check was successful or not. In some embodiments, inconsistencies in the simulated persistent memory 128' may cause the test function 206 to fail to execute to completion (e.g., by causing a crash, an infinite loop, or other error condition). In those embodiments, the computing device 100 may interpret failure to execute to completion as failing the consistency test. In some embodiments, in block 326 the computing device 100 may invoke the recovery function 204 in the platform simulator, prior to executing the test function 206. The recovery function 204 may attempt to repair any inconsistencies or other errors in the simulated persistent memory 128'. The recovery function 204 may be a standard component of the application 202. Thus, executing the test function 206 after the recovery function 204 may test if the application 202 can successfully recover from the state of the persistent memory 128 after a power failure.

In block 328, the computing device 100 determines whether the test function 206 failed. If not, the method 300 branches ahead to block 332, described below. If the test function 206 failed, the method 300 branches to block 330, in which the computing device 100 reports the failure. The computing device 100 may, for example, display a notification to a user, generate a report, or otherwise provide information concerning the failure. In some embodiments, the computing device 100 may report data concerning the particular permutation of persistent memory writes that caused the test failure. The user may use that data to reconstruct the failure, for example using a debugger. After reporting the test failure, the method 300 may proceed to block 332 to continue testing additional permutations.

Referring back to block 328, if the test function 206 does not fail, the method 300 branches to block 332. In block 332, the computing device 100 determines whether sufficient permutations of persistent memory writes have been tested. The computing device 100 may use any appropriate criteria for determining when sufficient permutations have been tested. For example, in some embodiment, the computing device 100 may determine whether all possible permutations that are allowed by the hardware specification of the simulated computing device 102 have been tested. In some embodiments, in block 334, the computing device 100 may determine whether the test coverage of the search space is sufficient, that is, whether a sufficiently large proportion of the possible permutations have been tested. The computing device 100 may, for example, determine whether a threshold number or a threshold percentage of possible permutations have been tested. In some embodiments, the computing device 100 may determine statistically, based on the proportion of possible permutations that have been tested, the likelihood that all errors in the application 202 have been found. The computing device 100 may determine whether sufficient permutations have been tested based on that likelihood.

In block 336, the computing device 100 checks whether sufficient permutations have been tested. If not, the method 300 loops back to block 314 to restore the simulated computing device 102 to the beginning of the current segment and generate the next permutation for testing. If sufficient permutations have been tested, the method 300 advances to block 338.

In block 338, the computing device 100 determines whether additional segments remain to be tested. For example, the computing device 100 may determine whether all segments up to the end location of the application 202 have been tested. If additional segments remain, the method 300 loops back to block 312, in which the computing device 100 determines the next segment and set of persistent memory writes for testing. If no additional segments remain, the method 300 advances to block 340, in which the computing device 100 reports that testing was successful. The computing device 100 may, for example, display a notification to a user, generate a report, or otherwise provide information concerning the successful validation. After reporting the validation, the method 300 is completed. The method 300 may be re-executed to re-test the application 202 or to test another application 202.

Referring now to FIG. 4, pseudocode 400 illustrates one potential embodiment of part of an application 202 that may be tested using the method 300. The statement 402 illustrates the initial state of the simulated persistent memory 128'. As shown, the simulated persistent memory 128' includes three variables A, B, and C, each storing values 10, 11, and 12, respectively. Statement 428 illustrates one potential embodiment of the test function 206. As shown, in the illustrative embodiment, the test function 206 is successful if A is less than B and B is less than C. The statements 404 through 426 represent a segment of the application 202 to be tested. The statement 404 corresponds to the test location (i.e., the location of the saved checkpoint at which the test is started) and the statement 426 corresponds to the end location.

In statement 404, a new value is written to the variable A in the simulated persistent memory 128'. After execution of the statement 404, the new value of A may be stored in a simulated processor 120' cache or other volatile memory. In statement 406, a memory fence is executed. The memory fence enforces ordering between the write of statement 404 and any other writes to the simulated persistent memory 128' occurring after the memory fence (e.g., statements 414, 418 described below). In statement 408, a cache flush is executed. The cache flush causes the new value of A to be written from the cache of the simulated processor 120' to the simulated persistent memory 128'. After execution of the cache flush, the new value of A may be accepted to the simulated persistent memory 128', but may not yet be durable. In statement 410, a memory fence is executed. The memory fence may enforce ordering between the cache flush of statement 408 and any other cache flushes. In statement 412, a persistent memory commit primitive is executed. The persistent memory commit primitive causes the new value of A that was accepted to the simulated persistent memory 128' to become durable. Thus, the new value of A may be available following a simulated power failure only after execution of the statement 412. As described above, the pseudocode 400 may be segmented by persistent memory commit primitives. Thus, during testing the statements 404 through 412 may be analyzed separately. Because those statements contain only a single persistent memory write, only one permutation of persistent memory writes may be tested. For that permutation, the statement 428 evaluates to true (i.e., 5<11 && 11<12 evaluates to true). Thus, the segment including statements 404 through 412 may be successfully validated.

In statement 414, a new value is written to the variable B in the simulated persistent memory 128'. After execution of the statement 414, the new value of B may be stored in the simulated processor 120' cache or other volatile memory. In statement 416, a value is written to the simulated volatile memory 126'. Because the contents of volatile memory are lost following a power failure, the computing device 100 may not trace the store to the simulated volatile memory 126' in statement 416. In statement 418, a new value is written to the variable C in the simulated persistent memory 128'. After execution of the statement 418, the new value of C may be stored in the simulated processor 120' cache or other volatile memory. In statement 420, a memory fence is executed. The memory fence enforces ordering between the writes in statement 414, 418 and any other writes to the simulated persistent memory 128' occurring after the memory fence. Note that the memory fence of statement 420 does not enforce ordering between the writes of statements 414, 418. In statement 422, a cache flush is executed. The cache flush causes the new values of B and C to be written from the simulated processor 120' cache to the simulated persistent memory 128'. After execution of the cache flush, the new values of B and C may be accepted to the simulated persistent memory 128', but may not yet be durable. In statement 424, a memory fence is executed. The memory fence may enforce ordering between the cache flush of statement 422 and any other cache flushes. In statement 426, a persistent memory commit primitive is executed. The persistent memory commit primitive causes the new values of B and C that were accepted to the simulated persistent memory 128' to become durable. Thus, the new values of both B and C may be available following a simulated power failure only after execution of the statement 412. As described above, the persistent memory commit primitive of statement 426 does not enforce ordering between the writes of statements 414, 418.

During testing, statements 414 through 426 may be analyzed as an independent segment. Those statements may have two possible permutations of persistent writes: the statement 414 may be committed before the statement 418 (i.e., in program order), or the statement 418 may be committed before the statement 414 (i.e., out-of-order). During testing, the computing device 100 may replay the permutation with the statement 418 committed before the statement 414. The computing device 100 may simulate a power failure when the write of the statement 418 has been committed to the simulated persistent memory 128' but the write of the statement 414 has not yet been committed to the simulated persistent memory 128'. In that scenario, the statement 428 evaluates to false (i.e., 5<11 && 11<7 evaluates to false) and thus the statements 414 through 426 may not be validated. In the illustrative embodiment, the validation error may be corrected by, for example, modifying the application 202 to insert a memory fence, cache line flush, and/or persistent memory commit primitive between the statements 414, 418 to enforce proper ordering.

EXAMPLES

Illustrative examples of the technologies disclosed herein are provided below. An embodiment of the technologies may include any one or more, and any combination of, the examples described below.

Example 1 includes a computing device for software testing, the computing device comprising a capture module to: (i) execute a code module using a platform simulator of the computing device from a test location in the code module to a second location in the code module and (ii) trace a persistent memory state of a simulated computing device simulated by the platform simulator during execution of the code module to generate trace data indicative of the persistent memory state; and a replay module to (i) generate a permutation of persistent memory writes based on the trace data, wherein the permutation of persistent memory writes has an ordering that is allowed by a hardware specification of the simulated computing device, (ii) replay the permutation of persistent memory writes, (iii) simulate a power failure in response to a replay of the permutation of persistent memory writes, and (iv) invoke a test function associated with the code module using the platform simulator in response to simulation of the power failure.

Example 2 includes the subject matter of Example 1, and wherein to trace the persistent memory state comprises to trace persistent memory writes executed by the code module.

Example 3 includes the subject matter of any of Examples 1 and 2, and wherein to trace the persistent memory state comprises to trace cache line flushes executed by the code module.

Example 4 includes the subject matter of any of Examples 1-3, and wherein to trace the persistent memory state comprises to trace memory fences executed by the code module.

Example 5 includes the subject matter of any of Examples 1-4, and wherein to trace the persistent memory state comprises to trace persistent memory commit primitives executed by the code module.

Example 6 includes the subject matter of any of Examples 1-5, and wherein to generate the permutation of persistent memory writes based on the trace data comprises to select a segment of the trace data delimited by a persistent memory commit primitive; and generate a permutation of persistent memory writes limited to the segment of the trace data.

Example 7 includes the subject matter of any of Examples 1-6, and wherein the capture module is further to generate a state checkpoint for the test location in the code module using the platform simulator, wherein the state checkpoint is indicative of the persistent memory state of the simulated computing device; and to replay the permutation of persistent memory writes comprises to replay the permutation of persistent memory writes based on the state checkpoint.

Example 8 includes the subject matter of any of Examples 1-7, and wherein to replay the permutation of persistent memory writes comprises to modify the state checkpoint as a function of the permutation of persistent memory writes.

Example 9 includes the subject matter of any of Examples 1-8, and wherein the replay module is further to restore the code module to the state checkpoint in response to execution of the code module from the test location in the code module to the second location in the code module.

Example 10 includes the subject matter of any of Examples 1-9, and wherein to generate the permutation of persistent memory writes based on the trace data comprises to randomly select a permutation from a set of all possible permutations of persistent memory writes definable by the trace data.

Example 11 includes the subject matter of any of Examples 1-10, and wherein to simulate the power failure comprises to stop the replay of the permutation when the permutation is partially completed.

Example 12 includes the subject matter of any of Examples 1-11, and wherein the replay module is further to invoke a recovery function associated with the code module using the platform simulator in response to the simulation of the power failure; wherein to invoke the test function comprises to invoke the test function in response to invocation of the recovery function.

Example 13 includes the subject matter of any of Examples 1-12, and wherein the replay module is further to determine whether the test function failed in response to invocation of the test function; and report a test failure in response to a determination that the test function failed.

Example 14 includes the subject matter of any of Examples 1-13, and wherein the replay module is further to determine whether sufficient permutations of persistent memory writes have been tested in response to invocation of the test function; and generate a second permutation of persistent memory writes based on the trace data in response to a determination that sufficient permutations of persistent memory writes have not been tested, wherein the second permutation of persistent memory writes has an ordering that is allowed by the hardware specification of the simulated computing device and is different from the ordering of the permutation of persistent memory writes.

Example 15 includes the subject matter of any of Examples 1-14, and wherein to determine whether sufficient permutations of persistent memory writes have been tested comprises to determine whether all possible permutations of persistent memory writes definable by the trace data that have an ordering that is allowed by the hardware specification of the simulated computing device have been tested.

Example 16 includes the subject matter of any of Examples 1-15, and wherein to determine whether sufficient permutations of persistent memory writes have been tested comprises to determine whether a proportion of all possible permutations of persistent memory writes definable by the trace data that have an ordering that is allowed by the hardware specification of the simulated computing device and that have been tested has a predefined relationship to a predetermined threshold proportion.

Example 17 includes the subject matter of any of Examples 1-16, and wherein the replay module is further to report a test success in response to a determination that sufficient permutations of persistent memory writes have been tested.

Example 18 includes a method for software testing, the method comprising simulating, by a platform simulator of a computing device, a simulated computing device; executing, by the platform simulator, a code module from a test location in the code module to a second location in the code module; tracing, by the computing device, a persistent memory state of the simulated computing device while executing the code module to generate trace data indicative of the persistent memory state; generating, by the computing device, a permutation of persistent memory writes based on the trace data, wherein the permutation of persistent memory writes has an ordering that is allowed by a hardware specification of the simulated computing device; replaying, by the computing device, the permutation of persistent memory writes; simulating, by the computing device, a power failure in response to replaying the permutation of persistent memory writes; and invoking, by the computing device, a test function associated with the code module using the platform simulator in response to simulating the power failure.

Example 19 includes the subject matter of Example 18, and wherein tracing the persistent memory state comprises tracing persistent memory writes executed by the code module.

Example 20 includes the subject matter of any of Examples 18 and 19, and wherein tracing the persistent memory state comprises tracing cache line flushes executed by the code module.

Example 21 includes the subject matter of any of Examples 18-20, and wherein tracing the persistent memory state comprises tracing memory fences executed by the code module.

Example 22 includes the subject matter of any of Examples 18-21, and wherein tracing the persistent memory state comprises tracing persistent memory commit primitives executed by the code module.

Example 23 includes the subject matter of any of Examples 18-22, and wherein generating the permutation of persistent memory writes based on the trace data comprises selecting a segment of the trace data delimited by a persistent memory commit primitive; and generating a permutation of persistent memory writes limited to the segment of the trace data.

Example 24 includes the subject matter of any of Examples 18-23, and further including generating, by the computing device, a state checkpoint for the test location in the code module using the platform simulator, wherein the state checkpoint is indicative of the persistent memory state of the simulated computing device; wherein replaying the permutation of persistent memory writes comprises replaying the permutation of persistent memory writes based on the state checkpoint.

Example 25 includes the subject matter of any of Examples 18-24, and wherein replaying the permutation of persistent memory writes comprises modifying the state checkpoint as a function of the permutation of persistent memory writes.

Example 26 includes the subject matter of any of Examples 18-25, and further including restoring, by the computing device, the code module to the state checkpoint in response to executing the code module from the test location in the code module to the second location in the code module.

Example 27 includes the subject matter of any of Examples 18-26, and wherein generating the permutation of persistent memory writes based on the trace data comprises randomly selecting a permutation from a set of all possible permutations of persistent memory writes definable by the trace data.

Example 28 includes the subject matter of any of Examples 18-27, and wherein simulating the power failure comprises stopping replay of the permutation when the permutation is partially completed.

Example 29 includes the subject matter of any of Examples 18-28, and further including invoking, by the computing device, a recovery function associated with the code module using the platform simulator in response to simulating the power failure; wherein invoking the test function comprises invoking the test function in response to invoking the recovery function.

Example 30 includes the subject matter of any of Examples 18-29, and further including determining, by the computing device, whether the test function failed in response to invoking the test function; and reporting, by the computing device, a test failure in response to determining that the test function failed.

Example 31 includes the subject matter of any of Examples 18-30, and further including determining, by the computing device, whether sufficient permutations of persistent memory writes have been tested in response to invoking the test function; and generating, by the computing device, a second permutation of persistent memory writes based on the trace data in response to determining that sufficient permutations of persistent memory writes have not been tested, wherein the second permutation of persistent memory writes has an ordering that is allowed by the hardware specification of the simulated computing device and is different from the ordering of the permutation of persistent memory writes.

Example 32 includes the subject matter of any of Examples 18-31, and wherein determining whether sufficient permutations of persistent memory writes have been tested comprises determining whether all possible permutations of persistent memory writes definable by the trace data that have an ordering that is allowed by the hardware specification of the simulated computing device have been tested.

Example 33 includes the subject matter of any of Examples 18-32, and wherein determining whether sufficient permutations of persistent memory writes have been tested comprises determining whether a proportion of all possible permutations of persistent memory writes definable by the trace data that have an ordering that is allowed by the hardware specification of the simulated computing device that have been tested has a predefined relationship to a predetermined threshold proportion.

Example 34 includes the subject matter of any of Examples 18-33, and further including reporting, by the computing device, a test success in response to determining that sufficient permutations of persistent memory writes have been tested.

Example 35 includes a computing device comprising a processor; and a memory having stored therein a plurality of instructions that when executed by the processor cause the computing device to perform the method of any of Examples 18-34.

Example 36 includes one or more machine readable storage media comprising a plurality of instructions stored thereon that in response to being executed result in a computing device performing the method of any of Examples 18-34.

Example 37 includes a computing device comprising means for performing the method of any of Examples 18-34.

Example 38 includes a computing device for software testing, the computing device comprising means for simulating, by a platform simulator of the computing device, a simulated computing device; means for executing, by the platform simulator, a code module from a test location in the code module to a second location in the code module; means for tracing a persistent memory state of the simulated computing device while executing the code module to generate trace data indicative of the persistent memory state; means for generating a permutation of persistent memory writes based on the trace data, wherein the permutation of persistent memory writes has an ordering that is allowed by a hardware specification of the simulated computing device; means for replaying the permutation of persistent memory writes; means for simulating a power failure in response to replaying the permutation of persistent memory writes; and means for invoking a test function associated with the code module using the platform simulator in response to simulating the power failure.

Example 39 includes the subject matter of Example 38, and wherein the means for tracing the persistent memory state comprises means for tracing persistent memory writes executed by the code module.

Example 40 includes the subject matter of any of Examples 38 and 39, and wherein the means for tracing the persistent memory state comprises means for tracing cache line flushes executed by the code module.

Example 41 includes the subject matter of any of Examples 38-40, and wherein the means for tracing the persistent memory state comprises means for tracing memory fences executed by the code module.

Example 42 includes the subject matter of any of Examples 38-41, and wherein the means for tracing the persistent memory state comprises means for tracing persistent memory commit primitives executed by the code module.

Example 43 includes the subject matter of any of Examples 38-42, and wherein the means for generating the permutation of persistent memory writes based on the trace data comprises means for selecting a segment of the trace data delimited by a persistent memory commit primitive; and means for generating a permutation of persistent memory writes limited to the segment of the trace data.

Example 44 includes the subject matter of any of Examples 38-43, and further including means for generating a state checkpoint for the test location in the code module using the platform simulator, wherein the state checkpoint is indicative of the persistent memory state of the simulated computing device; wherein the means for replaying the permutation of persistent memory writes comprises means for replaying the permutation of persistent memory writes based on the state checkpoint.

Example 45 includes the subject matter of any of Examples 38-44, and wherein the means for replaying the permutation of persistent memory writes comprises means for modifying the state checkpoint as a function of the permutation of persistent memory writes.

Example 46 includes the subject matter of any of Examples 38-45, and further including means for restoring the code module to the state checkpoint in response to executing the code module from the test location in the code module to the second location in the code module.

Example 47 includes the subject matter of any of Examples 38-46, and wherein the means for generating the permutation of persistent memory writes based on the trace data comprises means for randomly selecting a permutation from a set of all possible permutations of persistent memory writes definable by the trace data.

Example 48 includes the subject matter of any of Examples 38-47, and wherein the means for simulating the power failure comprises means for stopping replay of the permutation when the permutation is partially completed.

Example 49 includes the subject matter of any of Examples 38-48, and further including means for invoking a recovery function associated with the code module using the platform simulator in response to simulating the power failure; wherein the means for invoking the test function comprises means for invoking the test function in response to invoking the recovery function.

Example 50 includes the subject matter of any of Examples 38-49, and further including means for determining whether the test function failed in response to invoking the test function; and means for reporting a test failure in response to determining that the test function failed.

Example 51 includes the subject matter of any of Examples 38-50, and further including means for determining whether sufficient permutations of persistent memory writes have been tested in response to invoking the test function; and means for generating a second permutation of persistent memory writes based on the trace data in response to determining that sufficient permutations of persistent memory writes have not been tested, wherein the second permutation of persistent memory writes has an ordering that is allowed by the hardware specification of the simulated computing device and is different from the ordering of the permutation of persistent memory writes.

Example 52 includes the subject matter of any of Examples 38-51, and wherein the means for determining whether sufficient permutations of persistent memory writes have been tested comprises means for determining whether all possible permutations of persistent memory writes definable by the trace data that have an ordering that is allowed by the hardware specification of the simulated computing device have been tested.

Example 53 includes the subject matter of any of Examples 38-52, and wherein the means for determining whether sufficient permutations of persistent memory writes have been tested comprises means for determining whether a proportion of all possible permutations of persistent memory writes definable by the trace data that have an ordering that is allowed by the hardware specification of the simulated computing device that have been tested has a predefined relationship to a predetermined threshold proportion.

Example 54 includes the subject matter of any of Examples 38-53, and further including means for reporting a test success in response to determining that sufficient permutations of persistent memory writes have been tested.

The invention claimed is:

1. A computing device for software testing, the computing device comprising:
   a capture module to: (i) execute a code module using a platform simulator of the computing device from a test location in the code module to a second location in the code module and (ii) trace a persistent memory state of a simulated computing device simulated by the platform simulator during execution of the code module to generate trace data indicative of the persistent memory state including a plurality of persistent memory writes executed by the code module; and a replay module to (i) generate a permutation of the plurality of persistent memory writes executed by the code module based on the trace data, wherein the permutation of the plurality of persistent memory writes has an ordering that is allowed by a hardware specification of the simulated computing device, (ii) replay the permutation of the plurality of persistent memory writes to generate an adjusted persistent memory state, (iii) simulate a power failure in response to a replay of the permutation of persistent memory writes, wherein to simulate the power failure comprises to stop the replay of the permutation when the permutation is partially completed, and (iv) invoke a test function associated with the code module using the platform simulator with the adjusted persistent memory state in response to simulation of the power failure.

2. The computing device of claim 1, wherein to trace the persistent memory state comprises to trace persistent memory commit primitives executed by the code module.

3. The computing device of claim 2, wherein to generate the permutation of the plurality of persistent memory writes based on the trace data comprises to:
select a segment of the trace data delimited by a persistent memory commit primitive; and
generate a permutation of the plurality of persistent memory writes limited to the segment of the trace data.

4. The computing device of claim 1, wherein:
the capture module is further to generate a state checkpoint for the test location in the code module using the platform simulator, wherein the state checkpoint is indicative of the persistent memory state of the simulated computing device; and
to replay the permutation of the plurality of persistent memory writes comprises to replay the permutation of the plurality of persistent memory writes based on the state checkpoint.

5. The computing device of claim 4, wherein to replay the permutation of the plurality of persistent memory writes comprises to modify the state checkpoint to generate the adjusted persistent memory state as a function of the permutation of the plurality of persistent memory writes.

6. The computing device of claim 4, wherein the replay module is further to restore the code module to the state checkpoint in response to execution of the code module from the test location in the code module to the second location in the code module.

7. The computing device of claim 1, wherein the replay module is further to:
invoke a recovery function associated with the code module using the platform simulator in response to the simulation of the power failure;
wherein to invoke the test function comprises to invoke the test function in response to invocation of the recovery function.

8. The computing device of claim 1, wherein the replay module is further to:
determine whether sufficient permutations of the plurality of persistent memory writes have been tested in response to invocation of the test function; and
generate a second permutation of the plurality of persistent memory writes based on the trace data in response to a determination that sufficient permutations of the plurality of persistent memory writes have not been tested, wherein the second permutation of the plurality of persistent memory writes has an ordering that is allowed by the hardware specification of the simulated computing device and is different from the ordering of the permutation of the plurality of persistent memory writes.

9. The computing device of claim 8, wherein to determine whether sufficient permutations of the plurality of persistent memory writes have been tested comprises to determine whether all possible permutations of the plurality of persistent memory writes definable by the trace data that have an ordering that is allowed by the hardware specification of the simulated computing device have been tested.

10. The computing device of claim 8, wherein to determine whether sufficient permutations of the plurality of persistent memory writes have been tested comprises to determine whether a proportion of all possible permutations of the plurality of persistent memory writes definable by the trace data that have an ordering that is allowed by the hardware specification of the simulated computing device and that have been tested has a predefined relationship to a predetermined threshold proportion.

11. A method for software testing, the method comprising:
simulating, by a platform simulator of a computing device, a simulated computing device;
executing, by the platform simulator, a code module from a test location in the code module to a second location in the code module;
tracing, by the computing device, a persistent memory state of the simulated computing device while executing the code module to generate trace data indicative of the persistent memory state including a plurality of persistent memory writes executed by the code module;
generating, by the computing device, a permutation of the plurality of persistent memory writes executed by the code module based on the trace data, wherein the permutation of the plurality of persistent memory writes has an ordering that is allowed by a hardware specification of the simulated computing device;
replaying, by the computing device, the permutation of the plurality of persistent memory writes to generate an adjusted persistent memory state;
simulating, by the computing device, a power failure in response to replaying the permutation of persistent memory writes, wherein simulating the power failure comprises stopping replay of the permutation when the permutation is partially completed; and
invoking, by the computing device, a test function associated with the code module using the platform simulator with the adjusted persistent memory state in response to simulating the power failure.

12. The method of claim 11, further comprising:
generating, by the computing device, a state checkpoint for the test location in the code module using the platform simulator, wherein the state checkpoint is indicative of the persistent memory state of the simulated computing device;
wherein replaying the permutation of the plurality of persistent memory writes comprises replaying the permutation of the plurality of persistent memory writes based on the state checkpoint.

13. The method of claim 12, wherein replaying the permutation of the plurality of persistent memory writes comprises modifying the state checkpoint to generate the adjusted persistent memory state as a function of the permutation of the plurality of persistent memory writes.

14. The method of claim 11, further comprising:
  determining, by the computing device, whether sufficient permutations of the plurality of persistent memory writes have been tested in response to invoking the test function; and
  generating, by the computing device, a second permutation of the plurality of persistent memory writes based on the trace data in response to determining that sufficient permutations of the plurality of persistent memory writes have not been tested, wherein the second permutation of the plurality of persistent memory writes has an ordering that is allowed by the hardware specification of the simulated computing device and is different from the ordering of the permutation of the plurality of persistent memory writes.

15. The method of claim 14, wherein determining whether sufficient permutations of the plurality of persistent memory writes have been tested comprises determining whether all possible permutations of the plurality of persistent memory writes definable by the trace data that have an ordering that is allowed by the hardware specification of the simulated computing device have been tested.

16. The method of claim 14, wherein determining whether sufficient permutations of the plurality of persistent memory writes have been tested comprises determining whether a proportion of all possible permutations of the plurality of persistent memory writes definable by the trace data that have an ordering that is allowed by the hardware specification of the simulated computing device that have been tested has a predefined relationship to a predetermined threshold proportion.

17. One or more non-transitory, computer-readable storage media comprising a plurality of instructions that in response to being executed cause a computing device to:
  simulate, by a platform simulator of the computing device, a simulated computing device;
  execute, by the platform simulator, a code module from a test location in the code module to a second location in the code module;
  trace a persistent memory state of the simulated computing device while executing the code module to generate trace data indicative of the persistent memory state including a plurality of persistent memory writes executed by the code module;
  generate a permutation of the plurality of persistent memory writes executed by the code module based on the trace data, wherein the permutation of the plurality of persistent memory writes has an ordering that is allowed by a hardware specification of the simulated computing device;
  replay the permutation of the plurality of persistent memory writes to generate an adjusted persistent memory state;
  simulate a power failure in response to replaying the permutation of persistent memory writes, wherein to simulate the power failure comprises to stop replay of the permutation when the permutation is partially completed; and
  invoke a test function associated with the code module using the platform simulator with the adjusted persistent memory state in response to simulating the power failure.

18. The one or more non-transitory, computer-readable storage media of claim 17, wherein to trace the persistent memory state comprises to trace persistent memory commit primitives executed by the code module.

19. The one or more non-transitory, computer-readable storage media of claim 18, wherein to generate the permutation of the plurality of persistent memory writes based on the trace data comprises to:
  select a segment of the trace data delimited by a persistent memory commit primitive; and
  generate a permutation of the plurality of persistent memory writes limited to the segment of the trace data.

20. The one or more non-transitory, computer-readable storage media of claim 17, further comprising a plurality of instructions that in response to being executed cause the computing device to:
  generate a state checkpoint for the test location in the code module using the platform simulator, wherein the state checkpoint is indicative of the persistent memory state of the simulated computing device;
  wherein to replay the permutation of the plurality of persistent memory writes comprises to replay the permutation of the plurality of persistent memory writes based on the state checkpoint.

21. The one or more non-transitory, computer-readable storage media of claim 20, wherein to replay the permutation of the plurality of persistent memory writes comprises to modify the state checkpoint to generate the adjusted persistent memory state as a function of the permutation of the plurality of persistent memory writes.

22. The one or more non-transitory, computer-readable storage media of claim 17, further comprising a plurality of instructions that in response to being executed cause the computing device to:
  determine whether sufficient permutations of the plurality of persistent memory writes have been tested in response to invoking the test function; and
  generate a second permutation of the plurality of persistent memory writes based on the trace data in response to determining that sufficient permutations of the plurality of persistent memory writes have not been tested, wherein the second permutation of the plurality of persistent memory writes has an ordering that is allowed by the hardware specification of the simulated computing device and is different from the ordering of the permutation of the plurality of persistent memory writes.

23. The one or more non-transitory, computer-readable storage media of claim 22, wherein to determine whether sufficient permutations of the plurality of persistent memory writes have been tested comprises to determine whether all possible permutations of the plurality of persistent memory writes definable by the trace data that have an ordering that is allowed by the hardware specification of the simulated computing device have been tested.

24. The one or more non-transitory, computer-readable storage media of claim 22, wherein to determine whether sufficient permutations of the plurality of persistent memory writes have been tested comprises to determine whether a proportion of all possible permutations of the plurality of persistent memory writes definable by the trace data that have an ordering that is allowed by the hardware specification of the simulated computing device that have been tested has a predefined relationship to a predetermined threshold proportion.

* * * * *